Nov. 2, 1954    F. CREMER    2,693,411
METHOD OF PURIFYING MOLTEN PIG IRON
Filed Dec. 26, 1951
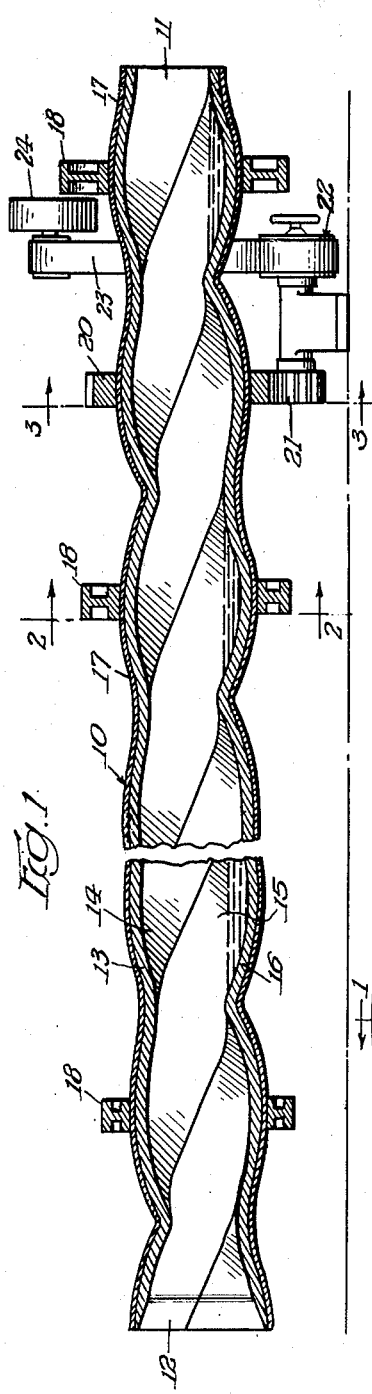
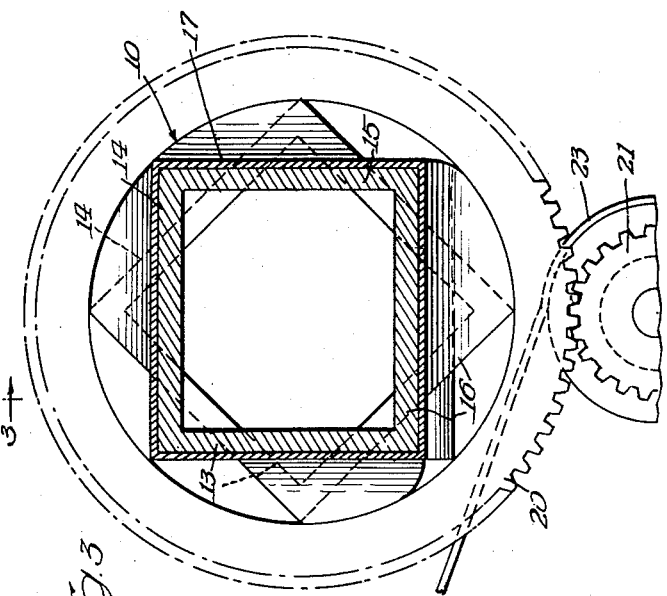
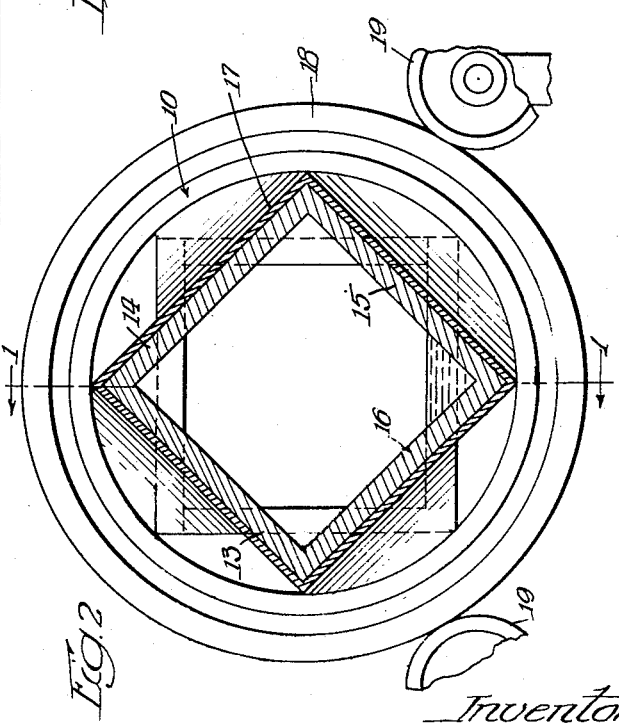
Inventor
Frederick Cremer
By Fred Gerlach atty.

United States Patent Office 2,693,411
Patented Nov. 2, 1954

2,693,411

METHOD OF PURIFYING MOLTEN PIG IRON

Frederick Cremer, Chicago, Ill.

Application December 26, 1951, Serial No. 263,372

3 Claims. (Cl. 75—46)

This invention relates to the purification of pig iron containing carbon, sulfur, silicon and phosphorus as impurities. In particular it relates to a method for reducing the sulfur, silicon and phosphorus content of the impure pig iron to an extent that the resulting pig iron is suitable for use in the production of steel and/or in the preparation of foundry iron.

This application is a continuation-in-part of my copending application Serial No. 15,853, filed March 19, 1948, now Patent No. 2,590,843, granted April 1, 1952.

The blast furnace production of pig iron invariably leaves in the iron a carbon, sulfur, silicon and phosphorus content substantially in excess of any reasonable requirement of the steel making industry for the production of steel and of the foundry industry for the production of foundry iron. These impurities are not usually present in the pig iron in their pure elemental form, but in the form of carbides, sulfides, phosphides and silicides of iron.

In accordance with the present invention the impurities are removed directly from impure hot metal, for example, molten pig iron from a blast furnace. The impure molten pig iron is introduced into a rotatable furnace wherein the pig iron and powdered (pulverized) lime or limestone, preferably the former, are admixed rapidly and uniformly and in extended surface contact, to effect a reduction of the sulfur, silicon and phosphorus contents of the pig iron to such an extent that the pig iron is suitable for steel making and/or for foundry iron, and, additionally, to effect a reduction of the carbon content of the pig iron. The mixing is effected progressively and mechanically as the impure molten pig iron and lime and/or reaction products pass through the furnace. This progressive, mechanical mixing is obtained by providing a furnace having an internal configuration such that when the mixture of molten pig iron and lime is in the furnace and the furnace is rotated, the molten pig iron in the form of a pool with the lime floating on top is advanced through the furnace, and while being advanced the shape and dimensions of the pool are continuously changed. The furnace imparts to the pool of pig iron a continuous roll-over and an alternate expansion and contraction of the surface area thereof along with a concomitant advance through the furnace so that during the passage of the pool and the lime through the furnace the desired rapid intermixture and extended surface contact and reaction between the impure molten pig iron and lime is obtained.

In accordance with my preferred practice, the internal configuration of the furnace should be such that when the pool of molten pig iron passes through the furnace there is effected in this pool an alternate change in the shape and the dimensions of the pool, namely, an alternate increase of surface area and decrease of depth of the pool and a decrease of surface area and increase of depth of the pool. It is preferred that the pools which have the largest surface area be quite shallow, preferably with a mean depth not exceeding about three inches. It is also preferred that the exposed area ratio of the wide, shallow pool to the relatively narrow, deep pool be in the order of about 2:1. In the wide, shallow pools there is provided the desired extended interfacial contact area between the molten pig iron and the lime for the reaction to remove the impurities. Reaction between the lime and the impurities in the pig iron also takes place in the alternate pools of increased depth and relatively small surface area; however, the reactions in these pools are not as rapid as in the wide, shallow pools. The successive change over of the pools from the shallow to the relatively deep form is essential to bring the lime into intimate contact with ever new and extended surfaces of impure molten pig iron.

The process of the present invention may be carried out to remove sulfur, silicon and phosphorus either separately or jointly from either common blast furnace hot metal or from cupola hot metal. The amounts of these impurities removed by my method can be controlled by controlling the amount of lime added to the impure hot metal introduced into the furnace, to provide in the treated metal no more of these impurities than can be tolerated in pig iron used for steel making. For example, common blast furnace hot metal contains about 4½% of carbon, 0.05% sulfur, 1% silicon and 0.1 to 0.5% phophorus. By my method the impurities such as sulfur, silicon and phosphorus can be reduced to amounts of each less than about 0.01% and the carbon content can be reduced to about 3½%.

The sulfur removal reaction in accordance with the present invention is carried out while maintaining the pig iron in a molten state throughout the reaction. I prefer to carry out the reaction at a temperature above about 2500° F., preferably above about 2600° F., say about 2700° F. to 2900° F., and under reducing conditions. The reducing conditions may be provided by silicon in the pig iron reaction with FeO as it is formed on the surface or by the reaction of the carbon in the pig iron with FeO and oxygen in the furnace atmosphere, or through the medium of a solid carbonaceous reducing agent such as powdered coal, or in any other known manner.

The removal of silicon and phosphorus is also carried out while maintaining the pig iron in a molten state. A very dull iron which has started to get mushy through partial solidification may be revived and brought to the proper fluidity (molten state) by a partial or complete oxidation of silicon and phosphorus. I prefer that the reaction initially be carried out at a temperature of about 2400° F. and in an oxidizing atmosphere suitably supplied in the form of an oxidizing gas flame of a temperature approximating 2400° F., played over the mixture of pig iron and lime passing through the furnace. Other means for providing the oxidizing reaction may, of course, be used. Some carbon is removed in the sulfur-reducing step, as well as in the step of removing silicon and phosphorus. The purification reactions of the present invention are, however, primarily for the removal of sulfur, silicon and phosphorus.

The reactions between the lime and the impurities present in the pig iron are exothermic. The reaction between the lime and the silicon and phosphorus, under oxidizing conditions, is strongly exothermic and the temperature of the reaction mass rises rapidly to at least about 2750° F., which is the optimum temperature that may be brought about by a partial or complete silicon removal. If the temperature of the mass rises substantially above about 2700° F., say above about 3000° F., it may have a detrimental effect on the lining of the furnace or of the ladle into which the reaction mass discharged from the furnace is poured. Hence I prefer to control the temperature conditions in the furnace so that excess heat substantially above about 2750° F. is dissipated. One way of effecting this control is to use limestone instead of lime. Other conventional means to control the temperature of the reaction may, of course, be used. The use of limestone is preferred since the lime content of this material is available for the necessary lime reactions described and because the material is relatively inexpensive. Of course, where limestone is used the quantity of limestone should be such as to provide the required amount of lime content for the necessary lime reaction.

The lime may be added in any form to the hot material charged to the furnace, but it is preferred that the lime be in powdered form. The quantity of lime used should be at least theoretically sufficient to combine with the sulfur, silicon and phosphorus contents of the pig iron. It is preferred to use an amount of lime slightly in excess of the stoichiometrical proportions required to combine with the sulfur, silicon and phosphorus, so as to provide an amount of liberated FeO sufficient to react with some but not all of the carbon content of the iron.

The main impurities removed by my process are sulfur, silicon and phosphorus. The removal of carbon is incidental to the removal of the other impurities; however, I prefer to effect the removal of sulfur, silicon and phosphorus with such an amount of lime as to provide an amount of lime for the production of stable lime slags by the replacement of FeO in the slag formed, thereby enabling the oxygen of the liberated FeO to combine with some of the carbon so as to bring the carbon content of the purified pig iron to about 3½%, since with that carbon content and with amounts of sulfur, silicon and phosphorus each below about 0.01%, the purified hot metal discharged from the furnace fits readily into the operating schedules of foundries as well as open hearth steel plants.

Where the sulfur requirements in the purified pig iron are less exacting, say only below about 0.025%, the sulfur-removal step may be dispensed with and the pig iron may be reacted directly with lime in an oxidizing atmosphere to remove silicon and phosphorus and, incidentally, some carbon. If desired, the silicon and phosphorus may be removed first in accordance with my invention and thereafter the sulfur may be removed under reducing conditions, as described, if the sulfur is present in objectionably large amounts. It is possible in accordance with the present invention to remove silicon, phosphorus and sulfur in a single operation. In this operation the impure pig iron is mixed with an amount of lime in excess of the stoichiometric formula $5CaO.SiO_2.P_2O_5$, and the mixture is reacted in the furnace under initially oxidizing conditions at a temperature of about 2500° to 2750° F. for a portion of its travel through the furnace to effect a reaction between the lime and the silicon and phosphorus contents of the pig iron. Thereafter the passage of the mixture through the remaining portion of the furnace is effected under reducing conditions at about the same temperature to effect the reaction between the lime and the sulfur content of the pig iron.

In the preferred operation where the impure pig iron is in a molten state and contains undesirably large amounts of sulfur, silicon and phosphorus, the pig iron is reacted under reducing conditions with lime in a single passage through the furnace to remove the sulfur. Thereafter, while the reaction mixture is still hot, it is passed through the furnace for a second time and reacted in an oxidizing atmosphere with additional amounts of lime to remove the silicon and phosphorus contents of the pig iron. When the reacted pig iron from the first pass through the furnace discharges from the furnace it is received in a ladle. A CaS slag rises to the top of the ladle and this is skimmed off. The residue in the ladle is returned for a second passage through the furnace to remove the silicon and phosphorus. When the reaction mass passes through the furnace for the second time and is discharged into a ladle, a $CaSiO_3$ slag and a calcium-phosphorus complex rises to the top and is skimmed off. The residue in the ladle, in a molten state, is ready for use in making steel and specialized foundry iron.

In the case where a cold and impure pig iron is to be treated, the sequence of purification of impurities must be reversed, eliminating silicon and phosphorus either partly or completely through oxidizing exothermic reactions which produce iron of desired temperature and fluidity, and then sulfur under reducing conditions, either in a single or double pass through the furnace, as desired.

Any rotary furnace of non-circular cross section, either horizontally or vertically disposed, may be used to effect the reactions between the impure pig iron and lime described above, but I prefer to effect the reactions in a rotary, elongated, horizontally disposed furnace having a non-circular transverse section of the type shown in the accompanying drawings, wherein:

Figure 1 is a diagrammatic longitudinal cross section of the furnace;

Fig. 2 is a transverse cross section taken substantially along the line 2—2 of Fig. 1; and Fig. 3 is a transverse cross section taken substantially along the line 3—3 of Fig. 1.

Referring to the drawings, there is shown a horizontally disposed furnace 10 having a longitudinal dimension substantially greater than its transverse dimension. The furnace throughout its length is preferably of rectangular cross section twisted convolutely, however, it may have any other geometrical form except circular. The receiving end of the furnace is shown at 11 and the discharge end is at 12. The furnace has inner side walls 13, 14, 15 and 16 of a basic refractory lining material to withstand the temperature of the molten metal to be treated within the furnace. The refractory lining is held within a steel shell 17.

Positioned along shell 17 are annular supports 18 supported by rollers 19 (Fig. 2). A ring gear 20 mounted on shell 17 is driven by a drive gear 21. Gear 21 is mounted on a suitable shaft on the opposite end of which is a variable speed pulley 22 driven by a belt 23 connected to a reversing mechanism 24. The mixing furnace is tilted longitudinally so that it is at a slightly lower level at the discharge end 12 than at its receiving end 11.

The furnace shown in the drawings is capable of being rotated in either a clockwise or counterclockwise direction at variable speeds. The non-circular vertical transverse cross section of the furnace varies progressively in shape from section to section through the furnace. The internal configuration of the furnace is such as to give the metals passing therethrough during rotation of the furnace alternate spreading out and contraction of the exposed upper surface with corresponding change in the depth of the materials, which is essential in effecting the intimate admixture of the powdered lime or limestone and of the molten pig iron and of the extended interfacial contact between the molten pig iron and the purifying material, required to effect the rapid purifying reactions in accordance with the method of the present invention.

I claim:

1. The method of treating pig iron containing carbon and objectionable amounts of sulfur, phosphorus and silicon impurities, to reduce the content of the said impurities, said method comprising introducing a mass of said pig iron in a molten state into a rotary furnace having a basic refractory lining of non-circular cross section to form a pool of said molten pig iron therein, introducing onto the surface of the molten pool of pig iron a powdered purifying material of the class consisting of lime and limestone, in an amount at least theoretically equivalent to that required to react with the said sulfur, and rotating the furnace to effect an alternate increase of surface area and decrease of depth and decrease of surface area and increase of depth of the pool and thus effect an exposure of the molten pig iron to the furnace atmosphere and an intimate mixture of the molten pig iron and purifying material, thereby producing a reaction between said purifying material and the sulfur content of the pig iron to form a slag reaction product, separating the slag from the molten pig iron, mixing the said molten pig iron with said purifying material in said furnace, in an amount at least theoretically equivalent to that required to react with the silicon and phosphorus contents of the pig iron, and again rotating the furnace to effect the said exposure and dimensional changes in the pool named above, thereby effecting a reaction between the purifying material and the silicon and phosphorus contents of the pig iron to form a slag reaction product, and separating the slag from the result purified iron.

2. The method of treating pig iron containing carbon and objectionable amounts of sulfur to reduce the said sulfur content, said method comprising introducing a mass of said pig iron in a molten state into a rotary furnace having a basic refractory lining of non-circular cross section to form a pool of said molten pig iron therein, introducing onto the surface of the molten pool of pig iron a powdered purifying material of the class consisting of lime and limestone, in an amount at least theoretically equivalent to that required to react with the said sulfur, and rotating the furnace to effect alternate increase of surface area and decrease of depth and decrease of surface area and increase of depth of the pool and thus effect an exposure of the molten pig iron to the furnace atmosphere and an intimate mixture of the molten pig iron and purifying material, thereby producing a reaction between said purifying material and the sulfur content of the pig iron to form a slag reaction product, and separating the slag from the molten pig iron.

3. The method of treating pig iron containing carbon and objectionable amounts of phosphorus and silicon impurities to reduce the content of said impurities, said method comprising introducing a mass of said pig iron in a molten state into a rotary furnace having a basic refractory lining of non-circular cross section to form a pool of said molten pig iron therein, introducing onto the surface of the molten pool of pig iron a powdered purifying material of the class consisting of lime and limestone, in an amount at least theoretically equivalent to that required to react with the said impurities, and rotating the furnace to effect alternate increase of surface area and decrease of depth and decrease of surface area and increase of depth of the pool and thus effect an exposure of the molten pig iron to the furnace atmosphere and an intimate mixture of the molten pig iron and purifying material, thereby producing a reaction between said purifying material and the said impurities to form a slag, and separating the slag from the molten pig iron.

References Cited in the file of this patent

UNITED STATES PATENTS

| Number | Name | Date |
|---|---|---|
| 465,672 | Lindenthal | Dec. 22, 1891 |
| 874,391 | Chute | Dec. 24, 1907 |
| 1,132,661 | Kranz | Mar. 23, 1915 |
| 1,580,533 | Richardson et al. | Apr. 13, 1926 |
| 2,246,133 | Greffe | June 17, 1941 |
| 2,258,850 | Eulenstein et al. | Oct. 14, 1941 |
| 2,622,977 | Kalling et al. | Dec. 23, 1952 |

FOREIGN PATENTS

| Number | Country | Date |
|---|---|---|
| 29,753 | Great Britain | of 1909 |